(12) United States Patent
Kido et al.

(10) Patent No.: US 10,174,696 B2
(45) Date of Patent: Jan. 8, 2019

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventors: Eiichiro Kido, Okazaki (JP); Masanao Idogawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/846,690

(22) Filed: Dec. 19, 2017

(65) Prior Publication Data

US 2018/0179971 A1  Jun. 28, 2018

(30) Foreign Application Priority Data

Dec. 27, 2016 (JP) .................................. 2016-254078
Mar. 13, 2017 (JP) .................................. 2017-047369

(51) Int. Cl.
| | |
|---|---|
| F02D 41/24 | (2006.01) |
| F02D 41/02 | (2006.01) |
| F01N 3/10 | (2006.01) |
| F02D 41/14 | (2006.01) |
| F01N 3/20 | (2006.01) |

(Continued)

(52) U.S. Cl.
CPC ........... *F02D 41/024* (2013.01); *F01N 3/101* (2013.01); *F01N 3/2033* (2013.01); *F01N 9/00* (2013.01); *F01N 11/007* (2013.01); *F02D 41/0082* (2013.01); *F02D 41/1408* (2013.01); *F02D 41/1475* (2013.01); *F01N 2250/04* (2013.01); *F01N 2430/02* (2013.01); *F01N 2430/06* (2013.01); *F01N 2560/025* (2013.01); *F01N 2610/03* (2013.01); *F01N 2900/08* (2013.01); *F01N 2900/1402* (2013.01);

(Continued)

(58) Field of Classification Search
CPC ............... F02D 41/024; F02D 41/0082; F02D 41/1408; F02D 41/1475; F01N 3/101; F01N 3/2033; F01N 9/00; F01N 11/007; F01N 2250/04; F01N 2430/02; F01N 2430/06

See application file for complete search history.

(56) References Cited

U.S. PATENT DOCUMENTS

| | | | | |
|---|---|---|---|---|
| 7,131,266 | B2 * | 11/2006 | Kita ..................... | F01N 3/2006 60/289 |
| 2018/0252177 | A1 * | 9/2018 | Myojo ................ | F02D 41/0055 |

FOREIGN PATENT DOCUMENTS

JP         2012-57492 A         3/2012

* cited by examiner

*Primary Examiner* — Hieu T Vo
(74) *Attorney, Agent, or Firm* — Oliff PLC

(57) ABSTRACT

A control apparatus for an internal combustion engine is provided. The control apparatus is equipped with an electronic control unit. A CPU with which this electronic control unit is equipped performs dither control for setting a first cylinder as a rich-burn cylinder whose air-fuel ratio is richer than a theoretical air-fuel ratio and setting each of second to fourth cylinders as a lean-burn cylinder whose air-fuel ratio is leaner than the theoretical air-fuel ratio, when a request to raise the temperature of a three-way catalyst is made. Then, the CPU reduces the degree of richness of the rich-burn cylinder and the degree of leanness of each of the lean-burn cylinders while continuing dither control, on the condition that fluctuations at a level equal to or higher than a predetermined value are caused in time-series data on the rotational speed resulting from the combustion in each of the cylinders.

10 Claims, 10 Drawing Sheets

(51) Int. Cl.
  *F01N 9/00* (2006.01)
  *F01N 11/00* (2006.01)
  *F02D 41/00* (2006.01)
(52) U.S. Cl.
  CPC ................. *F01N 2900/1602* (2013.01); *F01N 2900/1626* (2013.01); *F01N 2900/1631* (2013.01)

CONTROL APPARATUS FOR INTERNAL COMBUSTION ENGINE

CROSS-REFERENCE TO RELATED APPLICATIONS

This application claims priority to Japanese Patent Application No. 2017-047369 filed on Mar. 13, 2017, which is incorporated herein by reference in its entirety.

BACKGROUND

1. Technical Field

The disclosure relates to a control apparatus for an internal combustion engine that is designed to control the internal combustion engine, which is equipped with a catalyst that is designed to purify exhaust gas discharged from a plurality of cylinders.

2. Description of Related Art

For example, in Japanese Patent Application Publication No. 2012-57492 (JP 2012-57492 A), there is described a control apparatus for an internal combustion engine that is equipped with a three-way catalyst into which exhaust gas of four cylinders flows. This control apparatus performs perturbation control (dither control) for making one of the cylinders of the internal combustion engine a rich-burn cylinder whose air-fuel ratio is richer than a theoretical air-fuel ratio and making each of the other three cylinders a lean-burn cylinder whose air-fuel ratio is leaner than the theoretical air-fuel ratio, as the control of warming up (raising the temperature of) the catalyst. This aims at oxidizing unburnt fuel components and incompletely burnt components in the exhaust gas discharged from the rich-burn cylinder by the oxygen in the exhaust gas discharged from the lean-burn cylinders, and raising the temperature of the three-way catalyst by the heat of oxidation.

SUMMARY

By the way, when the aforementioned dither control is performed, the combustion of an air-fuel mixture in each of the cylinders may be destabilized as a result of dither control. In contrast, if dither control is stopped to stabilize combustion when combustion is destabilized, the temperature of the catalyst cannot be promptly raised. Besides, if dither control is performed after the temperature of the catalyst reaches its activation temperature, a fall in the temperature of the catalyst as well as the inability to promptly raise the temperature of the catalyst may be caused by stopping dither control to stabilize combustion when combustion is destabilized.

The disclosure has been made in view of such circumstances. The disclosure provides a control apparatus for an internal combustion engine that can favorably make the prompt raising of the temperature of a catalyst and the stabilization of combustion compatible with each other. Besides, the disclosure provides a control apparatus for an internal combustion engine that can stabilize combustion while restraining the temperature of a catalyst from falling through the stop of dither control. In short, the disclosure provides a control apparatus for an internal combustion engine that can favorably make the temperature raising performance of a catalyst and the stabilization of combustion compatible with each other.

Thus, according to one aspect of the disclosure, there is provided a control apparatus for an internal combustion engine. The control apparatus is equipped with an electronic control unit. This electronic control unit is configured to execute a dither control process and a reduction process. The dither control process is a process that is designed to control the internal combustion engine, which is equipped with a catalyst designed to purify exhaust gas discharged from a plurality of cylinders, and that operates fuel injection valves corresponding to the plurality of the cylinders respectively so as to control an air-fuel ratio in a lean-burn cylinder as one of the plurality of the cylinders or each of some of the plurality of the cylinders to an air-fuel ratio leaner than a target value for an average of air-fuel ratios in the plurality of the cylinders, and to control an air-fuel ratio in a rich-burn cylinder as the other cylinder or each of the other cylinders to an air-fuel ratio richer than the target value. The reduction process is a process that reduces a first difference between the air-fuel ratio in the lean-burn cylinder and the target value and a second difference between the air-fuel ratio in the rich-burn cylinder and the target value, while, on a condition that a level of rotational fluctuations of a crankshaft becomes equal to or higher than a predetermined value when the dither control process is executed, holding the average of the air-fuel ratios in the plurality of the cylinders equal to the target value by making the air-fuel ratio in the lean-burn cylinder leaner than the target value and making the air-fuel ratio in the rich-burn cylinder richer than the target value.

Besides, in the control apparatus, the electronic control unit may be configured to execute the dither control process and the reduction process when a request to raise a temperature of the catalyst is made. Besides, the electronic control unit may be configured to execute the dither control process and the reduction process when a temperature of the catalyst is equal to or higher than a predetermined temperature and equal to or lower than a prescribed temperature. Still further, the electronic control unit may be configured to execute the dither control process and the reduction process as soon as the internal combustion engine is started in a cold state.

In the configuration of the control apparatus for the internal combustion engine as described above, the state of combustion is improved by reducing the degree of leanness of the lean-burn cylinder and the degree of richness of the rich-burn cylinder on the condition that the level of rotational fluctuations becomes equal to or higher than the predetermined value when dither control is performed. In addition, on this occasion, dither control itself is continued. Therefore, the temperature of the catalyst can be more promptly raised and can be more restrained from falling than in the case where dither control is stopped. Therefore, the prompt raising of the temperature of the catalyst and the stabilization of combustion can be favorably made compatible with each other, and combustion can be stabilized while restraining the temperature of the catalyst from falling. That is, the temperature raising performance of the catalyst and the stabilization of combustion can be favorably made compatible with each other.

Besides, in the control apparatus for the internal combustion engine, the electronic control unit may be configured to execute the reduction process again after executing the reduction process on the condition that the level of the rotational fluctuations becomes equal to or higher than the predetermined value. In the configuration of the control apparatus as described above, the amount of a single reduction is likely to be set smaller than in the case where the degree of leanness of the lean-burn cylinder and the degree of richness of the rich-burn cylinder are reduced only once each time on the condition that the level of rotational fluctuations of the crankshaft becomes equal to or higher than the predetermined value, with a view to gradually reducing the degree of leanness and the degree of richness. Therefore, the degree of leanness and the degree of richness can be restrained from being excessively corrected in a reducing manner, while stabilizing combustion.

Besides, in the control apparatus for the internal combustion engine, the electronic control unit may be configured to, in the reduction process, make amounts of reduction larger when a frequency with which the level of the rotational fluctuations becomes equal to or higher than the predetermined value is higher than a predetermined frequency than when the frequency with which the level of the rotational fluctuations becomes equal to or higher than the predetermined value is equal to or lower than the predetermined frequency. Here, the amounts of reduction may be amounts by which the first difference and the second difference are respectively reduced on the condition that the level of the rotational fluctuations becomes equal to or higher than the predetermined value.

In the configuration of the control apparatus as described above, the amount of reduction in the degree of leanness of the lean-burn cylinder and the amount of reduction in the degree of richness of the rich-burn cylinder are made larger when the aforementioned frequency of rotational fluctuations is higher than the predetermined frequency than when the aforementioned frequency of rotational fluctuations is lower than the predetermined frequency. Therefore, the amounts of reduction can be made smaller to the utmost than in the case where the amounts of reduction are uniformly set regardless of the frequency, while improving the state of combustion. This is because the degree of destabilization of combustion tends to be larger when the frequency is higher than the predetermined frequency than when the frequency is equal to or lower than the predetermined frequency, and the tendency to make the amounts of reduction larger is desired from the standpoint of stabilizing combustion.

Besides, in the control apparatus for the internal combustion engine, the electronic control unit may be configured to: (i) hold the average of the air-fuel ratios in the plurality of the cylinders equal to the target value on a condition that the rotational fluctuations at the level equal to or higher than the predetermined value are not detected within a predetermined period, after executing the reduction process, and (ii) execute an increase process for increasing the first difference between the air-fuel ratio in the lean-burn cylinder and the target value and the second difference between the air-fuel ratio in the rich-burn cylinder and the target value, while holding the average of the air-fuel ratios in the plurality of the cylinders equal to the target value after executing the reduction process.

In the configuration of the control apparatus as described above, the degree of leanness of the lean-burn cylinder and the degree of richness of the rich-burn cylinder are increased on the condition that rotational fluctuations at the level equal to or higher than the predetermined value are not detected. Thus, the degree of leanness of the lean-burn cylinder and the degree of richness of the rich-burn cylinder can be made larger than in the case where they are not increased. Therefore, the temperature raising performance can be more enhanced by, for example, making the speed at which the temperature of the catalyst rises higher than in the case where the increase process is not executed, while stabilizing combustion.

Besides, in the control apparatus for the internal combustion engine, the electronic control unit may be configured to execute the increase process again on the condition that the rotational fluctuations at the level equal to or higher than the predetermined value are not detected within the predetermined period, after executing the increase process.

In the configuration of the control apparatus as described above, the degree of leanness of the lean-burn cylinder and the degree of richness of the rich-burn cylinder are gradually increased on the condition that rotational fluctuations at the level equal to or higher than the predetermined value are not detected. Thus, the degree of leanness and the degree of richness can be made larger to the utmost than in the case where they are increased only once, while stabilizing combustion.

Besides, in the control apparatus for the internal combustion engine, the electronic control unit may be configured to, in the increase process, make amounts of increase larger when a frequency with which the level of the rotational fluctuations becomes equal to or higher than the predetermined value is equal to or lower than a predetermined frequency than when the frequency with which the level of the rotational fluctuations becomes equal to or higher than the predetermined value is higher than the predetermined frequency. Here, the amounts of increase being amounts by which the first difference and the second difference are respectively increased on the condition that the rotational fluctuations at the level equal to or higher than the predetermined value are not detected within the predetermined period.

In the configuration of the control apparatus as described above, the amount of increase in the degree of leanness of the lean-burn cylinder and the amount of increase in the degree of richness of the rich-burn cylinder are made larger when the aforementioned frequency of rotational fluctuations is equal to or lower than the predetermined frequency than when the aforementioned frequency of rotational fluctuations is higher than the predetermined frequency. Therefore, the amounts of increase can be made larger to the utmost than in the case where the amounts of increase are uniformly set regardless of the frequency, while improving the state of combustion. This is because the degree of destabilization of combustion tends to be smaller and the amounts of increase can be made larger when the frequency is equal to or lower than the predetermined frequency than when the frequency is higher than the predetermined frequency, while stabilizing combustion.

Still further, in the control apparatus for the internal combustion engine, the electronic control unit may be configured to: (i) execute a request value setting process for variably setting a base request value as a base value of a request value of the first difference between the air-fuel ratio in the lean-burn cylinder and the target value and the second difference between the air-fuel ratio in the rich-burn cylinder and the target value, in accordance with an operating state of the internal combustion engine, (ii) execute a guard process for inputting the base request value and limiting the request value to a value equal to or smaller than a guard value, (iii) control the first difference between the air-fuel ratio in the lean-burn cylinder and the target value and the second difference between the air-fuel ratio in the rich-burn cylinder and the target value to the request value in the dither control process, (iv) reduce the guard value in the reduction process, and (v) increase the guard value toward the base request value in the increase process.

In the configuration of the control apparatus as described above, the base request value is variably set in accordance with the operating state of the internal combustion engine. Thus, appropriate values as the degree of leanness of the lean-burn cylinder and the degree of richness of the rich-burn cylinder in, for example, promptly raising the temperature of the catalyst in each operating state can be more finely set than in the case where the base request value is not variably set. Besides, in the configuration of the control apparatus as described above, the actual request value can be made as close to the base request value as possible while stabilizing combustion, by executing the reduction process and the increase process.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A control apparatus for an internal combustion engine of the first embodiment of the disclosure will be described hereinafter with reference to the drawings.

Figure 1:
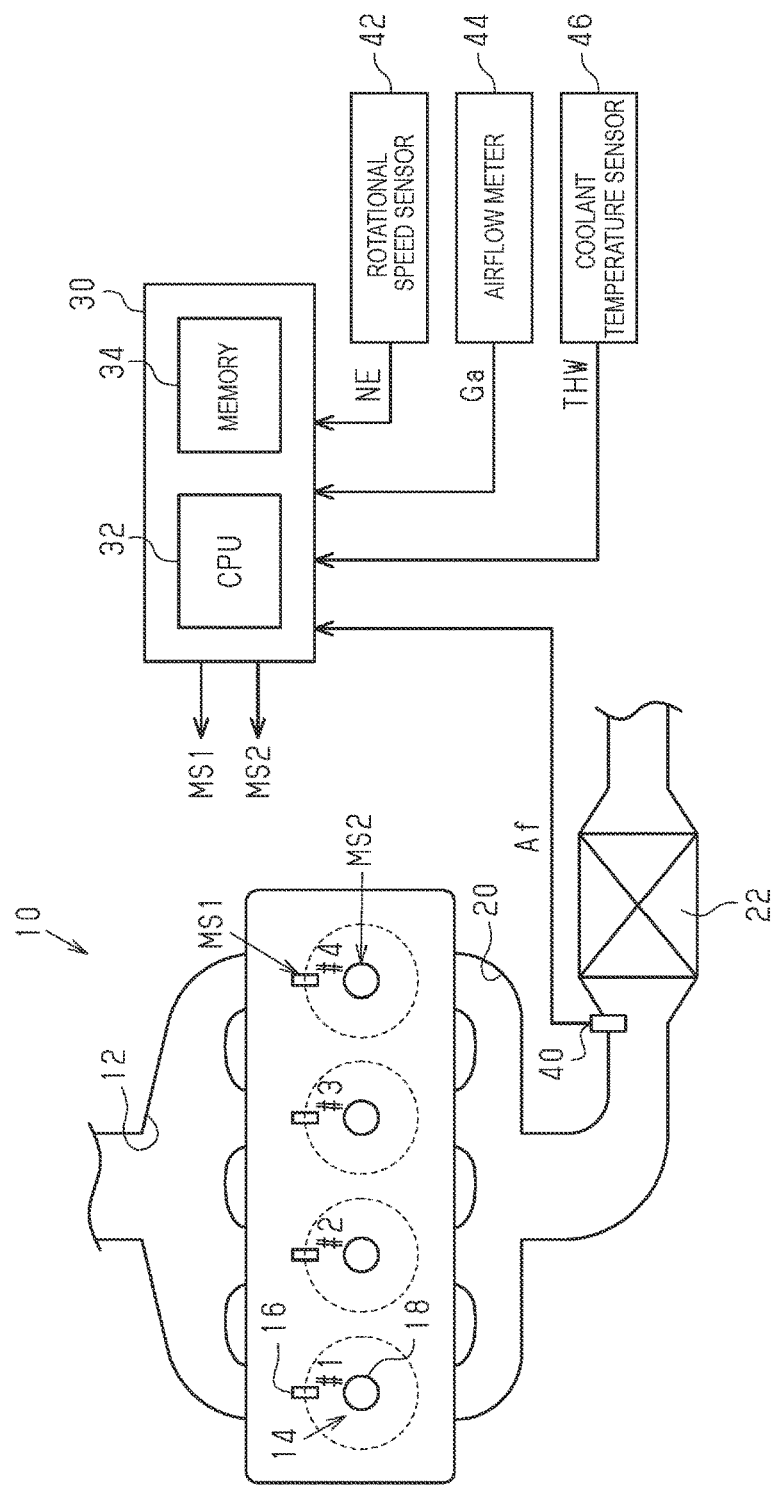
FIG. 1 is a view showing a control apparatus for an internal combustion engine of the first embodiment of the disclosure, and the internal combustion engine.

As shown in FIG. 1, an internal combustion engine 10 is equipped with four cylinders, namely, first to fourth cylinders #1 to #4. The air in an intake passage 12 of the internal combustion engine 10 is sucked into combustion chambers 14 of the respective first to fourth cylinders #1 to #4. Fuel injection valves 16 protrude into the combustion chambers 14 respectively. An air-fuel mixture made of the fuel injected from each of the fuel injection valves 16 and the air sucked into each of the combustion chambers 14 from the intake passage 12 is burned through spark discharge of each of ignition devices 18. The burnt air-fuel mixture is discharged to an exhaust passage 20 as exhaust gas. The exhaust passage 20 is provided with a three-way catalyst 22 for purifying exhaust gas.

The control apparatus for the internal combustion engine has an electronic control unit 30. This electronic control unit 30 is designed to control the internal combustion engine 10, and operates various actuators such as the fuel injection valves 16, the ignition devices 18 and the like so as to control controlled variables (a torque and components of exhaust gas) of the internal combustion engine 10. In order to control the controlled variables, the electronic control unit 30 refers to an air-fuel ratio Af that is detected by an air-fuel ratio sensor 40 that is provided upstream of the three-way catalyst 22, a rotational speed NE of a crankshaft that is detected by a rotational speed sensor 42, an intake air amount Ga that is detected by an airflow meter 44, and a coolant temperature THW that is detected by a coolant temperature sensor 46. The electronic control unit 30 is equipped with a central processing unit (a CPU) 32 and a memory 34. Then, the electronic control unit 30 controls the aforementioned controlled variables through the execution of a program stored in the memory 34 by the CPU 32.

Figure 2:
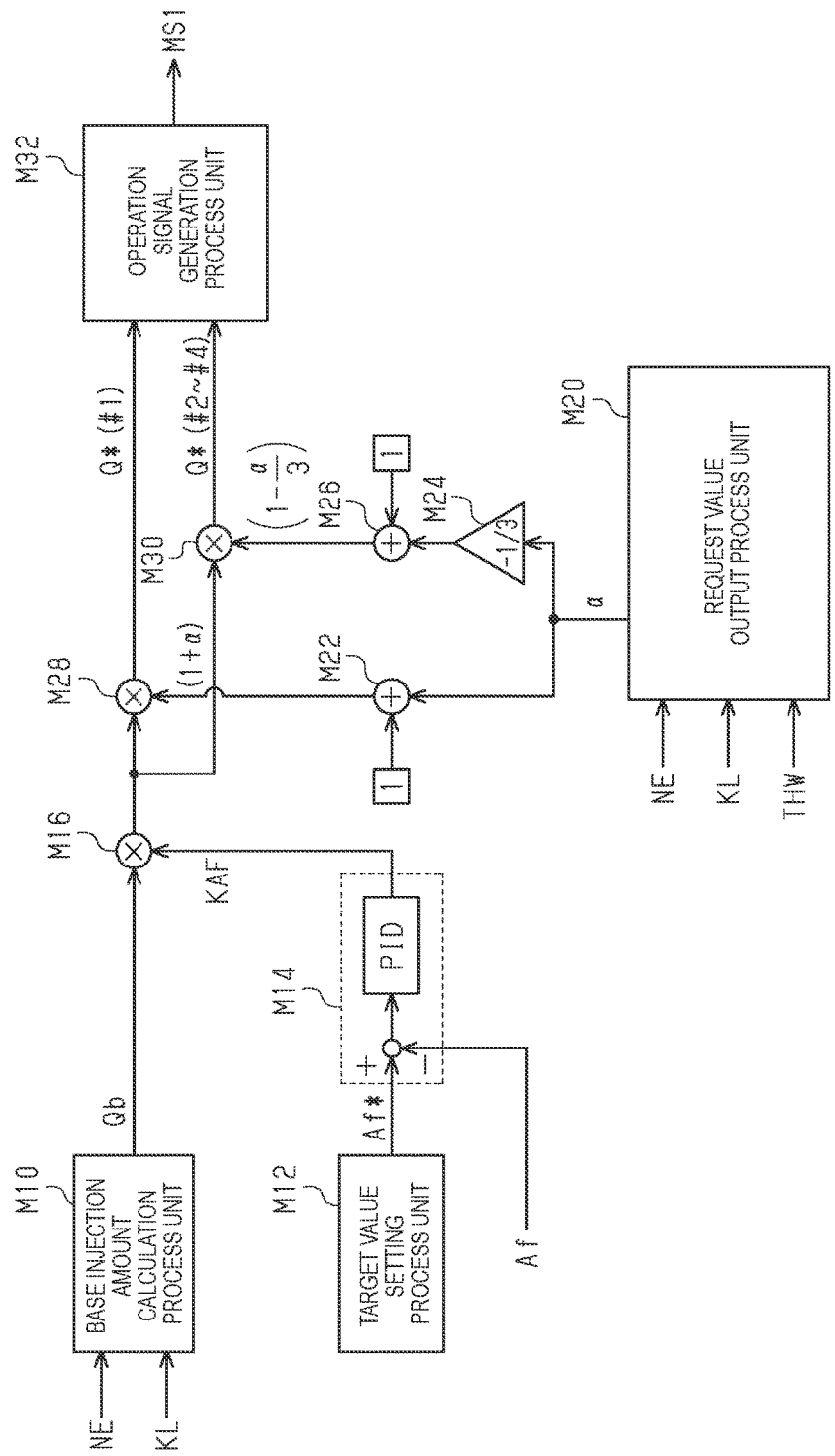
FIG. 2 is a block diagram showing a generation process for generating an operation signal for each fuel injection valve in the control apparatus in the first embodiment of the disclosure.

FIG. 2 shows some processes that are realized through the execution of the program stored in the memory 34 by the CPU 32. A base injection amount calculation process unit M10 calculates a base injection amount Qb as an open-loop operation amount for controlling the air-fuel ratio of the air-fuel mixture in each of the combustion chambers 14 to a target value Af*, based on the rotational speed NE and a load KL. It should be noted herein that the target value is a theoretical air-fuel ratio in the present embodiment of the disclosure. Besides, in the present embodiment of the disclosure, a load factor as a ratio of an actual amount of air with which each of the combustion chambers 14 is filled to a reference value of an amount of air with which each of the combustion chambers 14 is filled at the current rotational speed NE is exemplified as the load KL. The load factor is calculated based on the intake air amount Ga and the rotational speed NE.

A target value setting process unit M12 sets the target value Af* of the air-fuel ratio of the air-fuel mixture in each of the combustion chambers 14. A feedback process unit M14 calculates an operation amount KAF for controlling the air-fuel ratio Af that is detected by the air-fuel ratio sensor 40 to the target value Af* through feedback. In the present embodiment of the disclosure, the operation amount KAF is defined as the sum of respective output values, namely, a proportional element, an integral element, and a differential element when a value obtained by subtracting the air-fuel ratio Af from the target value Af* is input.

A feedback correction process unit M16 corrects the base injection amount Qb by multiplying the base injection amount Qb by the operation amount KAF. A request value output process unit M20 calculates an injection amount correction request value α of dither control for making the air-fuel ratios in the cylinders different from one another while holding the average of the air-fuel ratios in the respective cylinders #1 to #4 of the internal combustion engine 10 equal to the target value Af*, when a request to raise the temperature of the three-way catalyst 22 is made. It should be noted herein that the first cylinder #1 is a rich-burn cylinder whose air-fuel ratio is richer than the target value Af*, and each of the second to fourth cylinders #2 to #4 is a lean-burn cylinder whose air-fuel ratio is leaner than the target value Af*, in dither control according to the present embodiment of the disclosure. Then, the injection amount in the rich-burn cylinder is obtained by multiplying an output value of the feedback correction process unit M16 by "1+α", and the injection amount in each of the lean-burn cylinders is obtained by multiplying the output value by "1−(α/3)".

A correction coefficient calculation process unit M22 calculates a correction coefficient of the output value of the feedback correction process unit M16 as to the first cylinder #1, by adding the injection amount correction request value α to "1". A multiplication process unit M24 multiplies the injection amount correction request value α by "−⅓". A correction coefficient calculation process unit M26 calculates a correction coefficient of the output value of the feedback correction process unit M16 as to each of the second to fourth cylinders #2 to #4, by adding an output value of the multiplication process unit M24 to "1".

A dither correction process unit M28 calculates an injection amount command value Q* of the first cylinder #1 by multiplying the output value of the feedback correction process unit M16 by a correction coefficient "1+α". A dither correction process unit M30 calculates the injection amount command value Q* of each of the second to fourth cylinders #2 to #4 by multiplying the output value of the feedback correction process unit M16 by a correction coefficient "1−(α/3)".

An operation signal generation process unit M32 generates an operation signal MS1 for each of the fuel injection valves 16 based on the injection amount command value Q*, outputs the operation signal MS1 to a corresponding one of the fuel injection valves 16, and operates each of the fuel injection valves 16 such that the amount of fuel injected from each of the fuel injection valves 16 becomes equal to the injection amount command value Q*.

Figure 3:
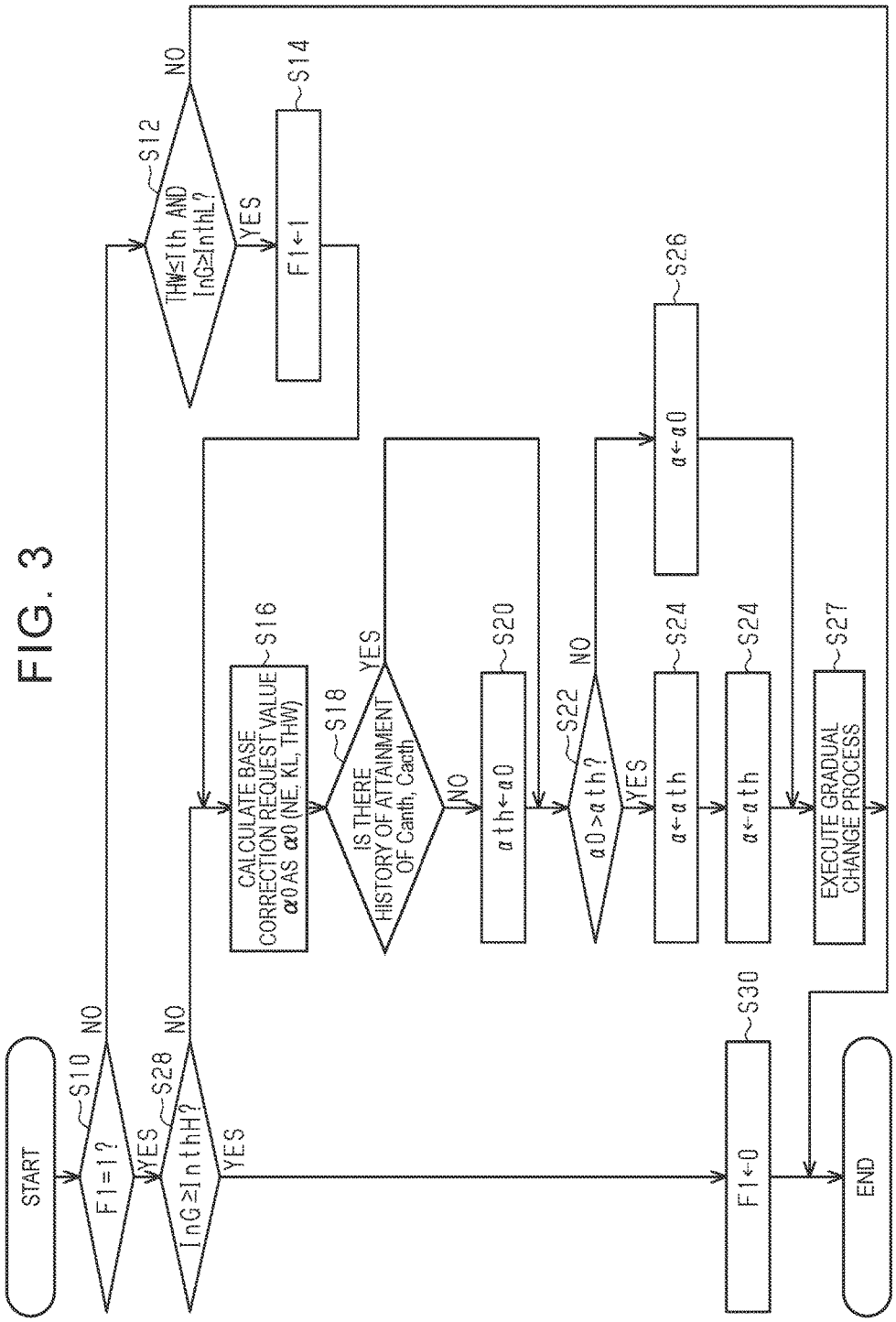
FIG. 3 is a flowchart showing the procedure of a calculation process for calculating an injection amount correction request value according to the first embodiment of the disclosure.

Next, the process of the request value output process unit M20 will be described using FIGS. 3 to 7. FIG. 3 shows the procedure of a calculation process for calculating the injection amount correction request value α. The process shown in FIG. 3 is realized through the repeated execution of the program stored in the memory 34 on a predetermined cycle by the CPU 32. Incidentally, each step number will be represented hereinafter by a numeral preceded by "S".

In a series of processing steps shown in FIG. 3, the CPU 32 first determines whether or not a flag F1 is "1" (S10). The flag F1 is "1" when dither control is performed, and is "0" when dither control is not performed. If it is determined that the flag F1 is "0" (NO in S10), the CPU 32 determines whether or not the logical product of a statement that the coolant temperature THW is equal to or lower than a predetermined temperature Twth and a statement that an integrated value InG of the intake air amount Ga since the start of the internal combustion engine 10 is equal to or larger than a first threshold InthL is true (S12). This processing step is intended to determine whether or not a condition for performing dither control is fulfilled. It should be noted herein that the condition that the coolant temperature THW is equal to or lower than the predetermined temperature Twth is a condition for determining that a request to raise the temperature of the three-way catalyst 22 is made when the internal combustion engine 10 is started in a cold state. On the other hand, the condition that the integrated value In is equal to or larger than the first threshold InthL is a condition for determining that the temperature of an upstream end portion of the three-way catalyst 22 has reached a catalyst activation temperature. This is a condition for effectively raising the temperature of the three-way catalyst 22 by accelerating a reaction between unburnt fuel components or incompletely burnt components in the exhaust gas from the rich-burn cylinder and the oxygen in the exhaust gas from each of the lean-burn cylinders through the use of the three-way catalyst 22. Incidentally, the integrated value InG is utilized as an amount that is correlated with a total amount of thermal energy generated through the combustion of the air-fuel mixture in the combustion chambers 14 during and after the start of the internal combustion engine 10.

If it is determined that the logical product is true (YES in S12), the CPU 32 sets the flag F1 to "1" (S14). Then, the CPU 32 calculates the base correction request value α0 as a base value of the aforementioned injection amount correction request value α (S16). In concrete terms, the CPU 32 variably sets the base correction request value α0 in accordance with the rotational speed NE, the load KL, and the coolant temperature THW. It should be noted herein that the CPU 32 sets the base correction request value α0 to a larger value when the coolant temperature THW is low than when the coolant temperature THW is high. This is because a request to make the speed at which the temperature of the three-way catalyst 22 is raised higher is made when the coolant temperature THW is low than when the coolant temperature THW is high. Besides, the CPU 32 sets the base correction request value α0 to a larger value when the rotational speed NE is low than when the rotational speed NE is high. This takes into account the fact that when the rotational speed NE is low, the number of combustion cycles per unit time is small and hence the speed at which the temperature of the three-way catalyst 22 rises due to dither control is lower than when the rotational speed NE is high. Besides, the CPU 32 sets the base correction request value α0 to a larger value when the load KL is high than when the load KL is low. This is because the stability of combustion is higher and hence the degree of leanness of each of the lean-burn cylinders and the degree of richness of the rich-burn cylinder are likely to be made larger when the load KL is high than when the load KL is low.

Then, the CPU 32 determines whether or not the logical sum of a statement that there is a history of the attainment of a threshold Canth by an inter-cylinder fluctuation counter Can that will be described later and a statement that there is a history of the attainment of a threshold Cacth by an inter-cycle fluctuation counter Cac is true (S18). Then, if it is determined that the logical sum is false (NO in S18), the CPU 32 makes a guard value αth of the injection amount correction request value α equal to the base correction request value α0 (S20). This processing step is intended to make the injection amount correction request value α equal to the base correction request value α0 when the level of rotational fluctuations of the crankshaft does not become high immediately after the start of dither control.

When the processing step of S20 is completed or if it is determined that the logical sum is true (YES in S18), the CPU 32 determines whether or not the base correction request value α0 is larger than the guard value αth (S22). Then, if it is determined that the base correction request value α0 is equal to or smaller than the guard value αth (NO in S22), the CPU 32 assigns the base correction request value α0 to the injection amount correction request value α (S26). On the other hand, if it is determined that the base correction request value α0 is larger than the guard value αth (YES in S22), the CPU 32 assigns the guard value αth to the injection amount correction request value α (S24).

When the processing steps of S24 and S26 are completed, the CPU 32 subjects the injection amount correction request value α to a gradual change process to restrain the injection amount correction request value α from abruptly changing (S27). Incidentally, when the injection amount correction request value α is calculated for the first time through a changeover in the flag F1 from "0" to "1", the CPU 32 regards the initial value of the injection amount correction request value α as zero.

On the other hand, if it is determined that the flag F1 is "1" (YES in S10), the CPU 32 determines whether or not the integrated value InG is equal to or larger than a second threshold InthH that is larger than the first threshold InthL (S28). This processing step is intended to determine whether or not a condition for ending dither control is fulfilled. It should be noted herein that the second threshold InthH is set to a value at the time when the entire three-way catalyst 22 is activated. If it is determined that the integrated value InG is smaller than the second threshold InthH (NO in S28), the CPU 32 proceeds to the processing step of S16. On the other hand, if it is determined that the integrated value InG is equal to or larger than the second threshold InthH (YES in S28), the CPU 32 sets the flag F1 to zero (S30).

Figure 4:
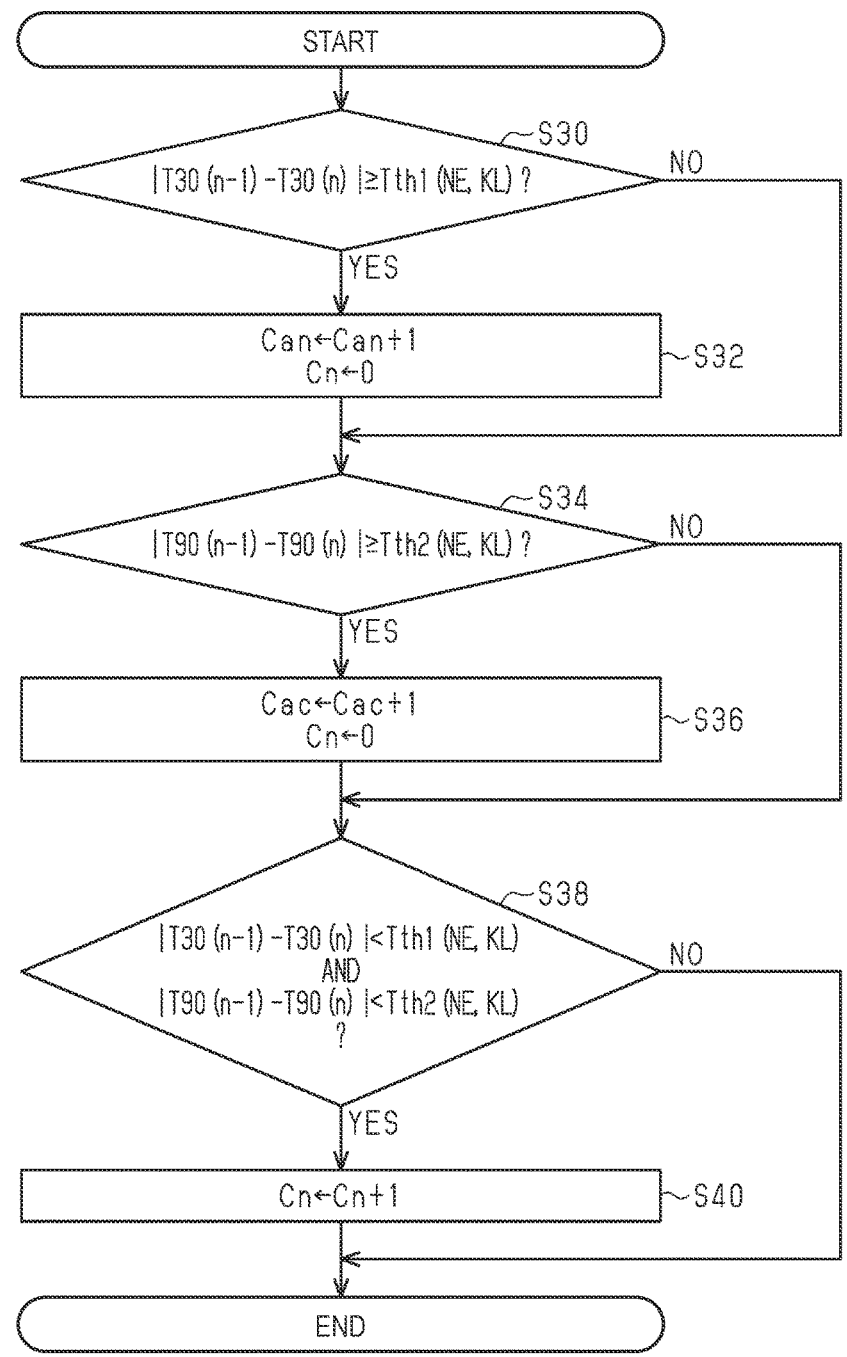
FIG. 4 is a flowchart showing the procedure of an update process for updating various counters according to the first embodiment of the disclosure.

Incidentally, when the processing steps of S27 and S30 are completed or if the result of the determination in S12 is negative, the CPU 32 temporarily ends the series of the processing steps shown in FIG. 3. FIG. 4 shows the procedure of an update process for updating various counters such as the inter-cylinder fluctuation counter Can, the inter-cycle fluctuation counter Cac and the like. The process shown in FIG. 4 is realized through the repeated execution of the program stored in the memory 34 on a cycle of, for example, 180° CA by the CPU 32.

Figure 5:
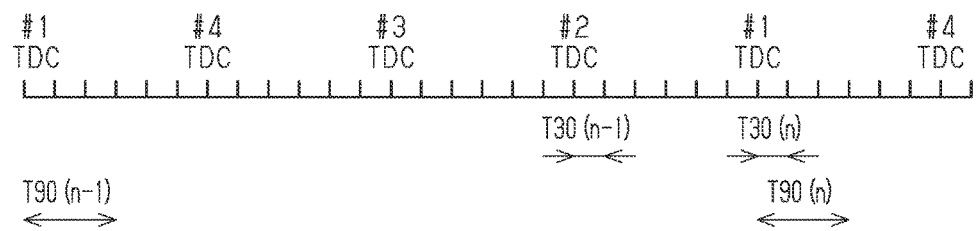
FIG. 5 is a time chart prescribing inter-cylinder rotational fluctuations and inter-cycle rotational fluctuations according to the first embodiment of the disclosure.

In a series of processing steps shown in FIG. 4, the CPU 32 first determines whether or not the absolute value of a difference between a time $T30(n)$ required for rotation in the cylinder that has most recently (hereinafter, currently) reached a compression top dead center in a section of "0 to 30° CA" and a time $T30(n-1)$ required for rotation in the second last cylinder that reached the compression top dead center in the section of "0 to 30° CA" is equal to or larger than a threshold Tth1 (S30). FIG. 5 exemplifies the time $T30(n)$ and the time $T30(n-1)$ in the case where the cylinder that has currently reached the compression top dead center is the first cylinder #1. The processing step S30 of FIG. 4 is a process for determining whether or not a difference (inter-cylinder rotational fluctuations) equal to or larger than a predetermined value is created between the rotational speeds resulting from combustion in the cylinders whose combustion strokes are subsequent to each other in a time-series manner. The CPU 32 variably sets the threshold Tth1 based on the rotational speed NE and the load KL. It should be noted herein that the threshold Tth1 is variably set in accordance with the rotational speed NE because it is more appropriate to evaluate the magnitude of the ratio between one of the time $T30(n)$ and the time $T30(n-1)$ and the other than the magnitude of the difference between the time $T30(n)$ and the time $T30(n-1)$ in quantifying rotational fluctuations between the cylinders. Therefore, the CPU 32 sets the threshold Tth1 to a smaller value when the rotational speed NE is high than when the rotational speed NE is low. Besides, the threshold Tth1 is variably set in accordance with the load KL because the fact that the stability of combustion is higher when the load KL is high than when the load KL is low on the premise that dither control is not performed is taken into account. That is, the CPU 32 restrains inter-cylinder rotational fluctuations from being detected due to the instability of the combustion that does not result from dither control, by setting the threshold Tth1 to a larger value when the load KL is low than when the load Kl is high.

If it is determined that the absolute value of the difference is equal to or larger than the threshold Tth1 (YES in S30), the CPU 32 increments the value of the inter-cylinder fluctuation counter Can that counts the number of times of detection of inter-cylinder rotational fluctuations, and initializes a normal combustion counter Cn that counts the number of times of the failure to detect rotational fluctuations (S32).

When the processing step of S32 is completed or if the result of the determination in S30 is negative, the CPU 32 proceeds to the processing step of S34. In the processing step of S34, the CPU 32 determines whether or not the absolute value of a difference between a time $T90(n)$ required for rotation in the cylinder that has currently reached the compression top dead center in a section of "0 to 90ATDC" and a time $T90(n-1)$ required for rotation in the cylinder in the section of "0 to 90ATDC" in the immediately preceding combustion cycle is equal to or larger than a threshold Tth2. FIG. 5 exemplifies the time $T90(n)$ and the time $T90(n-1)$ in the case where the cylinder that has currently reached the compression top dead center is the first cylinder #1. The processing step of S34 in FIG. 4 is a process for determining whether or not a difference (inter-cycle rotational fluctuations) equal to or larger than a predetermined value is created between the rotational speeds resulting from combustion in the specific cylinders whose combustion cycles are subsequent to each other in a time-series manner. The CPU 32 variably sets the threshold Tth2 based on the rotational speed NE and the load KL. It should be noted herein that the threshold Tth2 is variably set for the same reason why the threshold Tth1 is variably set.

If it is determined that the absolute value of the difference is equal to or larger than the threshold Tth2 (YES in S34), the CPU 32 increments the value of the inter-cycle fluctuation counter Cac that counts the number of times of detection of inter-cycle rotational fluctuations, and initializes the normal combustion counter Cn (S36).

When the processing step of S36 is completed or if the result of the determination in S34 is negative, the CPU 32 determines whether or not the logical product of a statement that inter-cylinder rotational fluctuations are not detected and a statement that inter-cycle rotational fluctuations are not detected is true in the current control cycle of the series of the processing steps shown in FIG. 4 (S38). Then, if it is determined that the logical product is true (YES in S38), the CPU 32 increments the value of the normal combustion counter Cn (S40).

Figure 6:
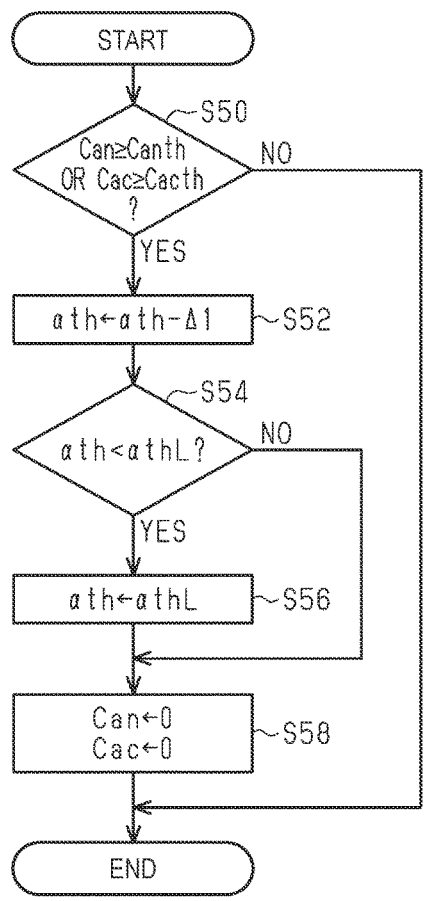
FIG. 6 is a flowchart showing the procedure of a reduction process for reducing a guard value according to the first embodiment of the disclosure.

Incidentally, when the processing step of S40 is completed or if the result of the determination in S38 is negative, the CPU 32 temporarily ends the series of the processing steps shown in FIG. 4. FIG. 6 shows the procedure of a reduction process for reducing the aforementioned guard value αth. The process shown in FIG. 6 is realized through the repeated execution of the program stored in the memory 34 on a predetermined time cycle by the CPU 32.

In a series of processing steps shown in FIG. 6, the CPU 32 first determines whether or not the logical sum of a statement that the value of the inter-cylinder fluctuation counter Can is equal to or larger than the threshold Canth and a statement that the value of the inter-cycle fluctuation counter Cac is equal to or larger than the threshold Cacth is true (S50). This processing step is intended to determine whether or not a condition for reducing the guard value αth is fulfilled. If it is determined that the logical sum is true (YES in S50), the CPU 32 corrects the guard value αth in a reducing manner by a predetermined amount Δ1 (S52). Then, the CPU 32 determines whether or not the guard value αth corrected in a reducing manner is smaller than a lower limit αthL (S54). It should be noted herein that the lower limit αthL is set to a value larger than zero. If it is determined that the guard value αth corrected in a reducing manner is smaller than the lower limit αthL (YES in S54), the CPU 32 assigns the lower limit αthL to the guard value αth (S56).

When the processing step of S56 is completed or if the result of the determination in S54 is negative, the CPU 32 initializes the inter-cylinder fluctuation counter Can and the inter-cycle fluctuation counter Cac (S58). Incidentally, when the processing step of S58 is completed or if the result of the determination in S50 is negative, the CPU 32 temporarily ends the series of the processing steps shown in FIG. 6.

Figure 7:
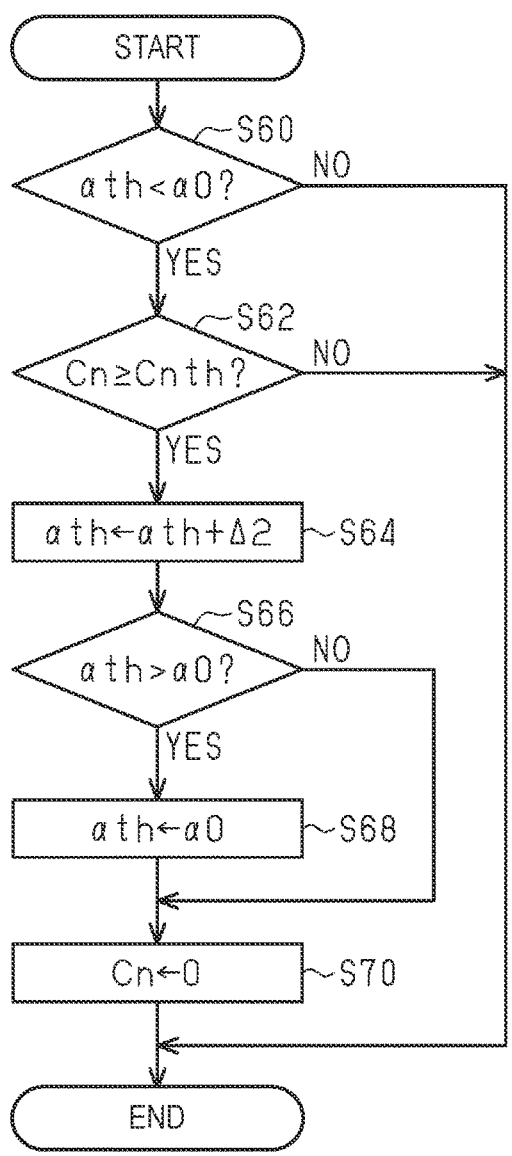
FIG. 7 is a flowchart showing the procedure of an increase process for increasing the guard value according to the first embodiment of the disclosure.

FIG. 7 shows the procedure of an increase process for increasing the guard value αth. The process shown in FIG. 7 is realized through the repeated execution of the program stored in the memory 34 on a predetermined time cycle by the CPU 32.

In a series of processing steps shown in FIG. 7, the CPU 32 first determines whether or not the guard value αth is smaller than the base correction request value α0 (S60). Then, if it is determined that the guard value αth is smaller than the base correction request value α0 (YES in S60), the CPU 32 determines whether or not the value of the normal combustion counter Cn is equal to or larger than a threshold Cnth (S62). The processing steps of S60 and S62 are intended to determine whether or not a condition for increasing the guard value αth is fulfilled. Then, if it is determined that the value of the normal combustion counter Cn is equal to or larger than the threshold Cth (YES in S62), the CPU 32 increases the guard value αth by a predetermined amount Δ2 (S64).

Subsequently, the CPU 32 determines whether or not the guard value αth is larger than the base correction request value α0 (S66). Then, if it is determined that the guard value αth is larger than the base correction request value α0 (YES in S66), the CPU 32 assigns the base correction request value α0 to the guard value αth (S68). When the processing step of S68 is completed or if the result of the determination in S66 is negative, the CPU 32 initializes the combustion counter Cn (S70).

Incidentally, when the processing step of S70 is completed or if the results of the determinations in S60 and S62 are negative, the CPU 32 temporarily ends the series of the processing steps shown in FIG. 7. The operation of the present embodiment of the disclosure will now be described.

Figure 8:
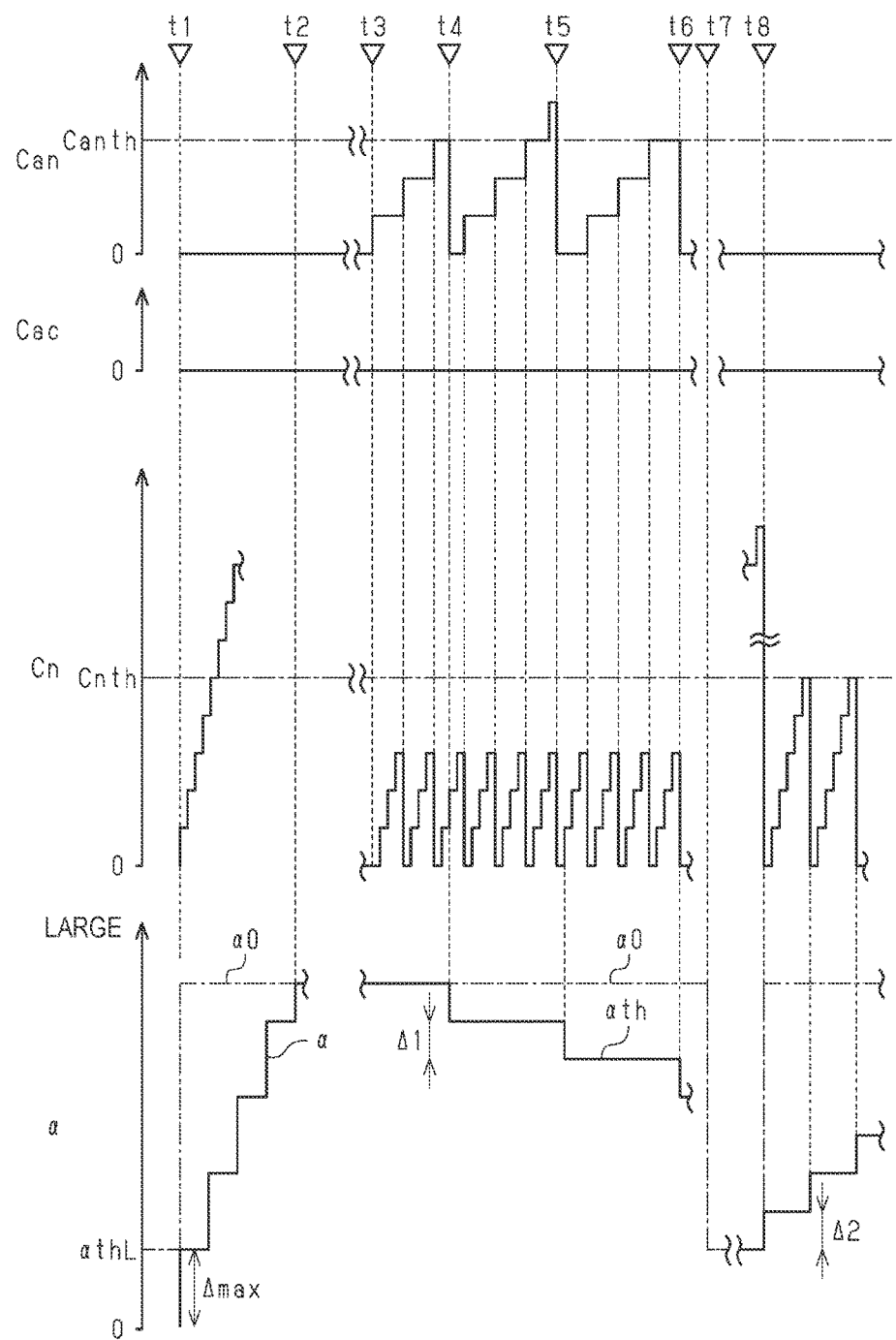
FIG. 8 is a time chart showing how the injection amount correction request value according to the first embodiment of the disclosure changes.

FIG. 8 shows how the value of the inter-cylinder fluctuation counter Can, the value of the inter-cycle fluctuation counter Cac, the value of the normal combustion counter Cn, and the injection amount correction request value α change. As shown in FIG. 8, when dither control is started at a time point t1, the injection amount correction request value α changes toward the base correction request value α0. An example in which the injection amount correction request value α gradually increases by an upper-limit change amount Δmax due to the gradual change process for limiting changes in the injection amount correction request value α because the base correction request value α0 is large is shown herein. Incidentally, FIG. 8 shows an example in which neither inter-cylinder rotational fluctuations nor inter-cycle rotational fluctuations are detected until a time point t2 when the injection amount correction request value α reaches the base correction request value α0.

For the sake of simplified explanation, FIG. 8 shows an example in which only inter-cylinder rotational fluctuations are detected at and after a time point t3. This can happen in the case where the combustion is unstable during each combustion cycle in only a specific one of the cylinders #1 to #4. In fact, however, some failsafe process can be inserted in the case where rotational fluctuations resulting from misfire or the like are continuously caused in a single cylinder. In the example shown in FIG. 8, however, no failsafe process or the like is inserted for the sake of convenience of explanation.

As shown in FIG. 8, every time inter-cylinder rotational fluctuations are caused, the normal combustion counter Cn is initialized. On the other hand, when the value of the inter-cylinder fluctuation counter Can becomes equal to or larger than the threshold Canth as exemplified at time points t4, t5, and t6, the guard value αth is corrected in a reducing manner by the predetermined amount Δ1, and the inter-cylinder fluctuation counter Can is initialized. Incidentally, the predetermined amount Δ1 is set to a value smaller than the upper-limit change amount Δmax. Besides, at the time point t5, the inter-cylinder fluctuation counter Can that assumes a value larger than the threshold Canth is initialized. This is a phenomenon that results from the fact that the cycle of the process shown in FIG. 6 is a time cycle.

FIG. 8 shows an example in which the base correction request value α0 decreases at a time point t7 and inter-cylinder rotational fluctuations are thereby eliminated. In this case, although the value of the normal combustion counter Cn increases, the base correction request value α0 and the injection amount correction request value α coincide with each other at and before a time point t8, so the guard value αth is not increased. However, when the base correction request value α0 is increased at the time point t8, the guard value αth is corrected in an increasing manner by the predetermined amount Δ2, and the normal combustion counter Cn is initialized because the injection amount correction request value α (the guard value αth in this case) is smaller than the base correction request value α0. After that, the value of the normal combustion counter Cn becomes equal to or larger than the threshold Cnth again, so the guard value αth is increased again by the predetermined amount Δ2.

As described hitherto, in the present embodiment of the disclosure, when combustion is destabilized during the performance of dither control, the process of raising the temperature of the three-way catalyst 22 is continued through dither control, while improving the state of combustion, by gradually reducing the injection amount correction request value α. Thus, the prompt raising of the temperature of the three-way catalyst 22 and the stabilization of combustion can be favorably made compatible with each other.

According to the present embodiment of the disclosure described above, the following effects are further obtained.

(1) Every time combustion is destabilized, the injection amount correction request value α is gradually reduced. Thus, the reduction amount of 1° (the predetermined amount Δ1) is likely to be set smaller than in the case where the injection amount correction request value α is reduced only by 1°. Therefore, the degree of leanness and the degree of richness can be restrained from being excessively corrected in a reducing manner while stabilizing combustion.

(2) The guard value αth is increased on the condition that the value of the normal combustion counter Cn becomes equal to or larger than the threshold Cnth. Thus, the speed at which the temperature of the three-way catalyst 22 rises can be made higher than in the case where the guard value αth is not increased, while stabilizing combustion.

(3) The guard value αth is gradually increased based on the value of the normal combustion counter Cn. Thus, the degree of leanness and the degree of richness can be made larger to the utmost than in the case where the guard value αth is increased only once, while stabilizing combustion.

(4) The base correction request value α0 is variably set in accordance with the operating state of the internal combustion engine 10, and the base correction request value α0 is subjected to the guard process according to the guard value αth. By variably setting the base correction request value α0 in accordance with the operating state of the internal combustion engine 10 in this manner, appropriate values as the degree of leanness of each of the lean-burn cylinders and the degree of richness of the rich-burn cylinder in promptly raising the temperature of the three-way catalyst 22 in each operating state can be more finely set than in the case where the base correction request value α0 is not variably set.

(5) The amount of increase (the predetermined amount Δ1) in the guard value αth in increasing the guard value αth based on the value of the normal combustion counter Cn is made smaller than the upper-limit change amount Δmax for limiting the speed of change in the injection amount correction request value α. Thus, combustion can be restrained from being destabilized again by increasing the injection amount correction request value α based on the value of the normal combustion counter Cn.

The second embodiment of the disclosure will be described hereinafter with reference to the drawings, focusing on what is different from the first embodiment of the disclosure.

Figure 9:
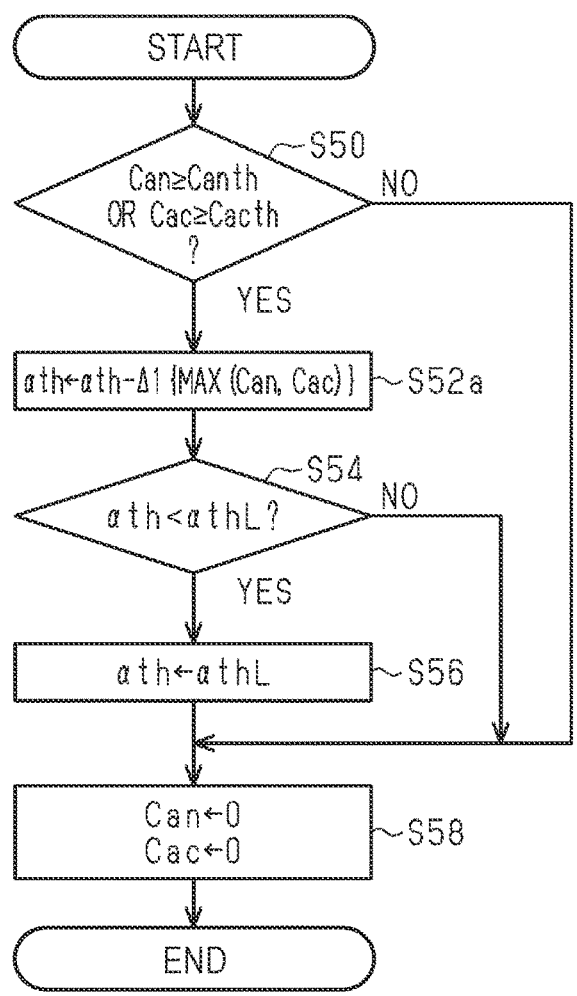
FIG. 9 is a flowchart showing the procedure of a reduction process for reducing a guard value in a control apparatus of the second embodiment of the disclosure.

In the present embodiment of the disclosure, the speed at which each of the degree of leanness and the degree of richness is reduced is variably set in accordance with the state of combustion. FIG. 9 shows the procedure of a reduction process for reducing the aforementioned guard value αth. The process shown in FIG. 9 is realized through the repeated execution of the program stored in the memory 34 on a predetermined time cycle by the CPU 32. Incidentally, in FIG. 9, processing steps corresponding to the processing steps shown in FIG. 6 are denoted by the same step numbers respectively, and the description thereof will be omitted.

In the series of the processing steps shown in FIG. 9, if the result of the determination in S50 is positive, the CPU 32 corrects the guard value αth in a reducing manner in accordance with the predetermined amount Δ1 that is variably set in accordance with the larger one of the value of the inter-cylinder fluctuation counter Can and the value of the inter-cycle fluctuation counter Cac (S52a). It should be noted herein that the CPU 32 sets the predetermined amount Δ1 to a larger value when the larger one of the value of the inter-cylinder fluctuation counter Can and the value of the inter-cycle fluctuation counter Cac is large than when the larger one of the value of the inter-cylinder fluctuation counter Can and the value of the inter-cycle fluctuation counter Cac is small. Then, when the processing step of S52a is completed, the CPU 32 proceeds to the processing step of S54.

Incidentally, the CPU 32 proceeds to the processing step of S58 not only when the processing step of S56 is completed or if the result of the determination in S54 is negative but also if the result of the determination in S50 is negative. Thus, when the processing step of S52a is executed, the inter-cylinder fluctuation counter Can and the inter-cycle fluctuation counter Cac indicate the frequencies of inter-cylinder rotational fluctuations and inter-cycle rotational fluctuations within a control cycle of the series of the processing steps of FIG. 9, respectively.

According to the present embodiment of the disclosure, the degree of leanness and the degree of richness can be reduced in accordance with the lowness of the degree of stability of combustion, by variably setting the speed at which the guard value αth is reduced as described above.

The third embodiment of the disclosure will be described hereinafter with reference to the drawings, focusing on what is different from the second embodiment of the disclosure.

Figure 10:
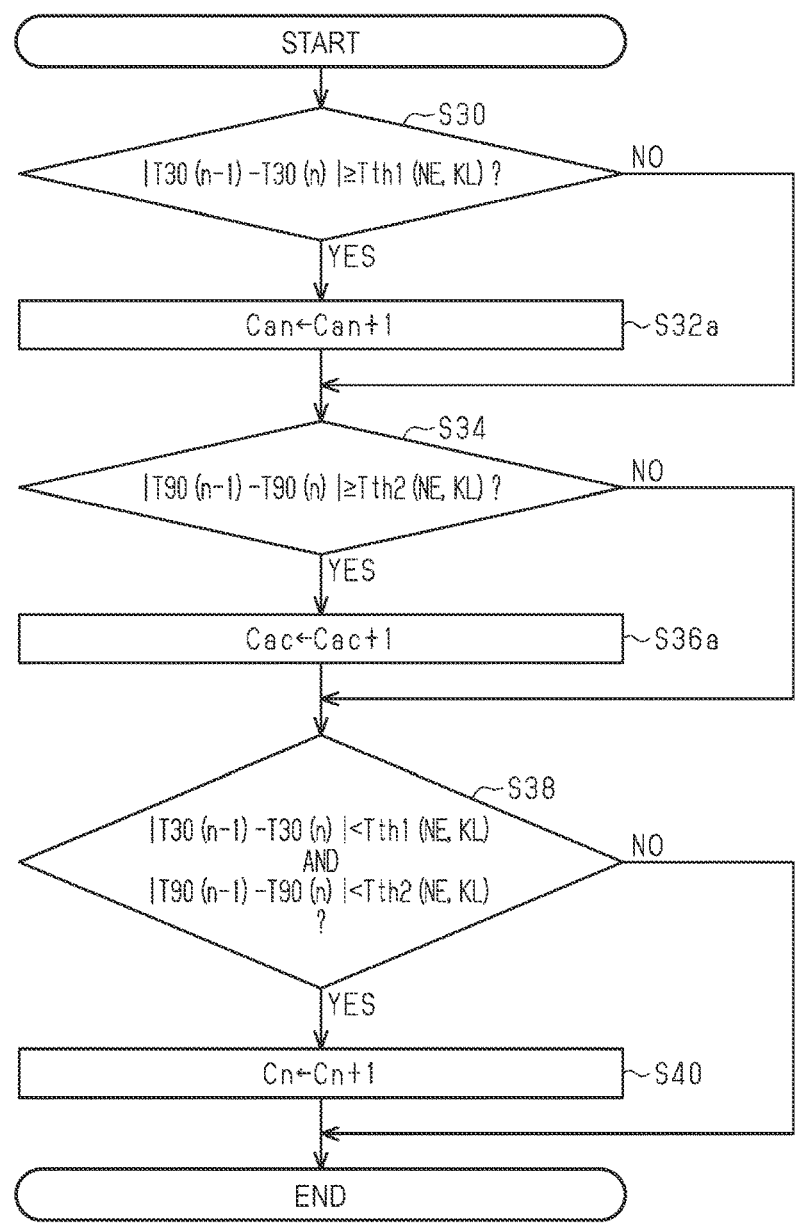
FIG. 10 is a flowchart showing the procedure of an update process for updating various counters in a control apparatus of the third embodiment of the disclosure.

In the present embodiment of the disclosure, the speed at which each of the degree of leanness and the degree of richness is increased is also variably set in accordance with the state of combustion. FIG. 10 shows the procedure of an update process for updating various counters such as the inter-cylinder fluctuation counter Can, the inter-cycle fluctuation counter Cac and the like. The process shown in FIG. 10 is realized through the repeated execution of the program stored in the memory 34 on a cycle of, for example, 180° CA by the CPU 32. Incidentally, in FIG. 10, processing steps corresponding to the processing steps shown in FIG. 4 are denoted by the same step numbers respectively, and the description thereof will be omitted.

In the series of the processing steps shown in FIG. 10, if the result of the determination in S30 is positive, the CPU 32 increments the value of the inter-cylinder fluctuation counter Can, but does not initialize the normal combustion counter Cn (S32a). Besides, if the result of the determination in S34 is positive, the CPU 32 increments the value of the inter-cycle fluctuation counter Cac, but does not initialize the normal combustion counter Cn (S36a). These changes are intended to quantify the frequencies with which inter-cylinder rotational fluctuations and inter-cycle rotational fluctuations are not detected by the normal combustion counter Cn.

Figure 11:
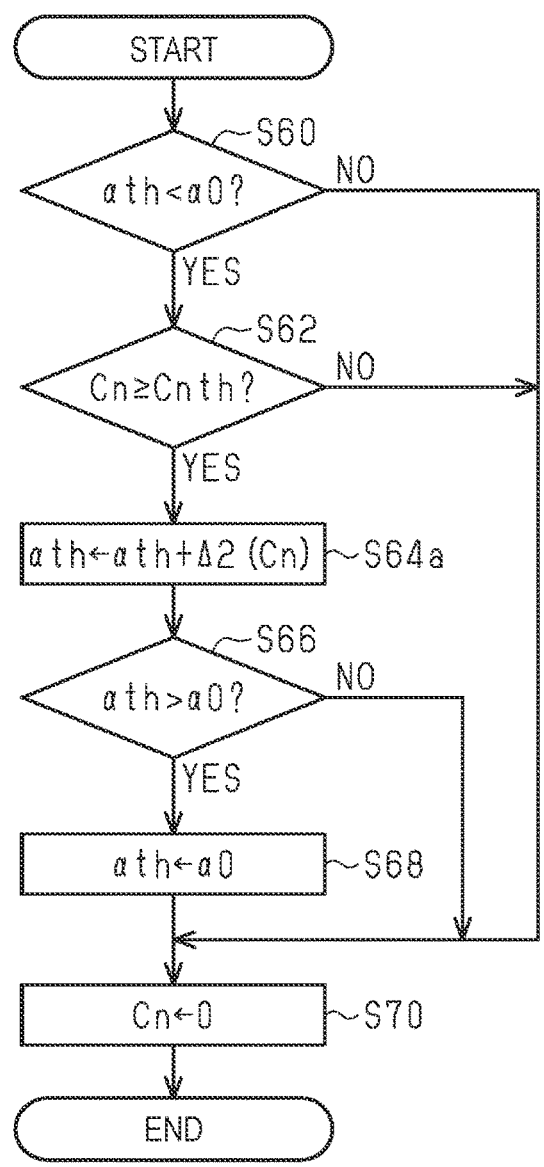
FIG. 11 is a flowchart showing the procedure of an increase process for increasing a guard value in the control apparatus of the third embodiment of the disclosure.

FIG. 11 shows the procedure of an increase process for increasing the guard value αth. The process shown in FIG. 11 is realized through the repeated execution of the program stored in the memory 34 on a predetermined time cycle by the CPU 32. Incidentally, in FIG. 11, processing steps corresponding to the processing steps shown in FIG. 7 are denoted by the same step numbers respectively, and the description thereof will be omitted.

In the series of the processing steps shown in FIG. 11, if the result of the determination in S62 is positive, the CPU 32 corrects the guard value αth in an increasing manner with the predetermined amount Δ2 variably set by the normal combustion counter Cn (S64a). It should be noted herein that the CPU 32 sets the predetermined amount 42 to a larger value when the value of the normal combustion counter Cn is large than when the value of the normal combustion counter Cn is small. Incidentally, the CPU 32 proceeds to S70 not only when the processing step of S68 is completed or if the result of the determination in S66 is negative but also if the results of the determinations in S60 and S62 are negative. This is the setting of the normal combustion counter Cn at the time point when the processing step of S64a is executed, with the frequencies with which inter-cylinder rotational fluctuations and inter-cycle rotational fluctuations are not detected within a control cycle of the series of the processing steps of FIG. 11.

According to the present embodiment of the disclosure, the degree of leanness and the degree of richness can be increased in accordance with the lowness of the degree of stability of combustion, by variably setting the speed at which the guard value αth is increased as described above.

The matters in each of the aforementioned embodiments of the disclosure correspond to the matters described in the aforementioned section of "Summary" as follows.

[1] The dither control process corresponds to the processes of the correction coefficient calculation process unit M22, the multiplication process unit M24, the correction coefficient calculation process unit M26, the dither correction process units M28 and M30, and the operation signal generation process unit M32 at the time when the injection amount correction request value α is not equal to "0". [2] The reduction process corresponds to the processing steps of S52 and S52a. [3] The variable setting of the amount of reduction is realized by the processing step of S52a. [4] The predetermined period corresponds to the interval of emergence of combustion strokes that are adjacent to each other in a time-series manner, in other words, the period of rotation of 180° CA. That is, the process of FIG. 4 is executed at intervals of 180° CA. In the case where neither inter-cylinder rotational fluctuations nor inter-cycle rotational fluctuations are detected within the period, the value of the normal combustion counter Cn is incremented, and the guard value αth is corrected in an increasing manner by the predetermined amount Δ2 based on the increment of the value of the normal combustion counter Cn. This corresponds to the increase in the guard value αth on the condition that neither inter-cylinder rotational fluctuations nor inter-cycle rotational fluctuations are detected in the period of rotation of 180° CA. [5] The increase process corresponds to the processing steps of S64 and S64a. [6] The variable setting of the amount of increase is realized by the processing step of S64a. [7] The request value setting process corresponds to the processing step of S16, and the guard process corresponds to the processing steps of S22 to S26. Incidentally, the request value of the difference between the air-fuel ratio in each of the lean-burn cylinders and the target value corresponds to "1−(α0/3)", and the request value of the difference between the air-fuel ratio in the rich-burn cylinder and the target value corresponds to "1+α0 ". It should be noted herein that each of the request values of the differences is regarded as being set through the process of setting the base correction request value α0 in the processing step of S16.

Next, embodiments of the disclosure other than the aforementioned first to third embodiments thereof will be described. Incidentally, at least one of the respective matters of the aforementioned embodiments of the disclosure may be changed as follows. The reduction process is not absolutely required to reduce the guard value αth on the condition that the logical sum of the statement that the value of the inter-cylinder fluctuation counter Can is equal to or larger than the threshold Canth and the statement that the value of the inter-cycle fluctuation counter Cac is equal to or larger than the threshold Cacth is true. For example, the guard value αth may be reduced on the condition that the value of the inter-cycle fluctuation counter Cac is equal to or larger than the threshold Cacth, without using the inter-cylinder fluctuation counter Can. Besides, for example, the guard value αth may be reduced on the condition that the value of the inter-cylinder fluctuation counter Can is equal to or larger than the threshold Canth, without using the inter-cycle fluctuation counter Cac. Besides, for example, the guard value αth may be reduced on the condition that the sum of inter-cylinder rotational fluctuations and inter-cycle rotational fluctuations is equal to or larger than a threshold, without providing the inter-cylinder fluctuation counter Can and the inter-cycle fluctuation counter Cac separately from each other.

The reduction process is not absolutely required to gradually reduce the injection amount correction request value α. For example, the injection amount correction request value α may be reduced to the lower-limit αthL as soon as the level of rotational fluctuations becomes equal to or higher than a predetermined value. In this case, however, a process of gradually increasing the injection amount correction request value α on the condition that the level of rotational fluctuations does not become equal to or higher than the predetermined value is desired to be executed.

In the processing step of S52a in FIG. 9, the predetermined amount Δ1 is variably set in accordance with the larger one of the value of the inter-cylinder fluctuation counter Can and the value of the inter-cycle fluctuation counter Cac, but the disclosure is not limited thereto. For example, the predetermined amount Δ1 may be variably set in accordance with the sum of the value of the inter-cylinder fluctuation counter Can and the value of the inter-cycle fluctuation counter Cac.

The increase process is not absolutely required to increase the guard value αth on the condition that the value of the normal combustion counter Cn, which is incremented on the condition that the logical product of the statement that no inter-cylinder rotational fluctuations are detected and the statement that no inter-cycle rotational fluctuations are detected is true, is equal to or larger than the threshold Cnth. For example, the value of the normal combustion counter Cn may be incremented on the condition that no inter-cycle rotational fluctuations are detected, without referring to inter-cylinder rotational fluctuations. Besides, for example, the value of the normal combustion counter Cn may be incremented on the condition that no inter-cylinder rotational fluctuations are detected, without referring to inter-cycle rotational fluctuations.

The increase process is not absolutely required to gradually increase the injection amount correction request value α. For example, in the third embodiment of the disclosure, the injection amount correction request value α may be increased only by 1° in a state where there is no change in the base correction request value α0.

It is not indispensable to variably set the base correction request value α0 based on the rotational speed NE, the load KL, and the coolant temperature THW. For example, the base correction request value α0 may be variably set based on only two of the three parameters, namely, the rotational speed NE, the load KL, and the coolant temperature THW. Besides, for example, the base correction request value α0 may be variably set based on only one of the three parameters.

The variable setting of the base correction request value α0 based on the aforementioned parameters is, in itself, not indispensable. When the process of variably setting the base correction request value α0 based on the aforementioned parameters is not executed, the base correction request value α0, the injection amount correction request value α, and the guard value αth may not be distinguished from one another. That is, for example, the reduction process for reducing the guard value αth in each of the aforementioned embodiments of the disclosure may be replaced with a reduction process for reducing the injection amount correction request value α, or the like.

The condition for performing dither control and executing the reduction process is not limited to what is exemplified in each of the aforementioned embodiments of the disclosure. For example, a sensor that detects the temperature of the three-way catalyst may be provided, and the condition for performing dither control and executing the reduction process may be that the detection value of the sensor is equal to or higher than a predetermined temperature and equal to or lower than a prescribed temperature. However, the disclosure is not limited to this condition, but dither control may be performed and the reduction process may be executed since the start of the internal combustion engine 10 on the condition that the internal combustion engine 10 is started in a cold state, with a view to, for example, simplifying the control.

Incidentally, the period of performance of dither control is not limited to the period to the timing when the entire three-way catalyst reaches its activation temperature. For example, even after the entire three-way catalyst has reached its activation temperature, dither control may be performed for a sulfur poisoning recovery process. Besides, for example, when the three-way catalyst enters a temperature range that is higher than the activation temperature of the three-way catalyst and that makes the amount of poisoning by sulfur likely to increase, dither control may be performed to make the temperature of the three-way catalyst higher than the temperature range. Besides, for example, the condition for performing dither control may be that a request to raise the temperature of an exhaust pipe is made to restrain condensed water from adhering to the exhaust pipe. This can be realized by, for example, performing dither control on the condition that the logical product of the statement that the temperature of outside air is equal to or lower than a criterial value and the statement that the load is equal to or lower than a predetermined value is true. Besides, the condition for performing dither control may be that a request to remove particulate matters with which a GPF is clogged is made in the case where the GPF is used as a catalyst as described below in the section of "As for Catalyst". This can be realized by performing dither control on the condition that the difference between the pressure upstream of the GPF and the pressure downstream of the GPF is equal to or higher than a threshold. Besides, in the case where the temperature of the upstream end portion of the three-way catalyst has reached the activation temperature of the catalyst, dither control may always be performed unless the temperature of the upstream end portion of the three-way catalyst becomes excessively high to the extent of causing a deterioration in the reliability of the three-way catalyst. In the case of each of these embodiments of the disclosure, the stop of dither control in the case of destabilized combustion does not necessarily hinder the temperature of the catalyst from being promptly raised, but may also constitute a factor in the fall in the temperature of the catalyst. Then in this case, the changing of the degree of leanness and the degree of richness according to each of the aforementioned embodiments of the disclosure has a technical significance in that the temperature of the catalyst can be restrained from falling and the temperature raising performance thereof can be ensured while securing the stability of combustion.

As for the numbers of lean-burn and rich-burn cylinders, the number of lean-burn cylinder(s) is larger than the number of rich-burn cylinder(s) in each of the aforementioned embodiments of the disclosure, but the disclosure is not limited thereto. For example, the number of lean-burn cylinder(s) and the number of rich-burn cylinder(s) may be equal to each other. Incidentally, the sum of the number of lean-burn cylinder(s) and the number of rich-burn cylinder(s) is not absolutely required to coincide with the number of cylinders of the internal combustion engine 10. For example, a specific one of the cylinders may be made different from the lean-burn and rich-burn cylinders by making the air-fuel ratio in the combustion chamber 14 of the specific one of the cylinders equal to the theoretical air-fuel ratio. Incidentally, as described below in the section of "As for Internal Combustion Engine", even in the case where a plurality of catalysts that are designed to purify different types of exhaust gas are provided, the sum of the number of lean-burn cylinder(s) whose exhaust gas is designed to be purified by one of the catalysts and the number of rich-burn cylinder(s) whose exhaust gas is designed to be purified by that one of the catalysts is smaller than the number of cylinders of the internal combustion engine.

The dither control process is not absolutely required to set the amount of correction of the injection amount. For example, the base injection amount calculation process units M10 may be provided separately for the rich-burn cylinder and the lean-burn cylinders. In this case, the base injection amount calculation process unit M10 for the rich-burn cylinder calculates the base injection amount Qb as an open-loop operation amount for making the target air-fuel ratio rich, and the base injection amount calculation process unit M10 for the lean-burn cylinders calculates the base injection amount Qb as an open-loop operation amount for making the target air-fuel ratio lean. Incidentally, in this case, the average of the air-fuel ratios of the air-fuel mixture in the combustion chambers 14 of the respective cylinders may be made equal to the target value Af*. In this case, the net components of exhaust gas in all the cylinders can deviate from the components of exhaust gas in the case where the average of the air-fuel ratios of exhaust gas is equal to the target value. However, this deviation may be compensated for by feedback control of the air-fuel ratio.

Incidentally, the aforementioned exhaust gas air-fuel ratio of target exhaust gas is defined using a virtual air-fuel mixture. That is, the virtual air-fuel mixture is defined as an air-fuel mixture in which the concentrations of unburnt fuel (e.g., HC), incompletely burnt components (e.g., CO) and oxygen in the exhaust gas that consists of only fresh air and fuel and that is generated when being burned are equal to the concentrations of unburnt fuel, incompletely burnt components and oxygen in target exhaust gas respectively. The exhaust gas air-fuel ratio is defined as the air-fuel ratio of the virtual air-fuel mixture. In this case, however, the combustion of the virtual air-fuel mixture is not limited to the combustion in which at least either the concentrations of unburnt fuel and incompletely burnt components or the concentration of oxygen are/is equal to zero or can be regarded as zero, but also includes the combustion in which both the concentrations of unburnt fuel and incompletely burnt components and the concentration of oxygen are higher than zero. Besides, the average of the exhaust gas air-fuel ratios of the plurality of the cylinders means an exhaust gas air-fuel ratio in the case where the entire exhaust gas discharged from the plurality of the cylinders is target exhaust gas. Incidentally, in each of the aforementioned embodiments of the disclosure, the average of the exhaust gas air-fuel ratios of all the cylinders is controlled to the target value.

In each of the aforementioned embodiments of the disclosure, the target value of the average of the air-fuel ratios of the internal combustion engine is equal to the theoretical air-fuel ratio, but the disclosure is not limited thereto. For example, when a GPF that is equipped with a three-way catalyst is used as a catalyst as described in the section of "As for Catalyst", the target value of the average of the air-fuel ratios of the internal combustion engine may be leaner than the theoretical air-fuel ratio. Incidentally, in this case, the air-fuel ratio of each of the lean-burn cylinders is leaner than both the theoretical air-fuel ratio and the target value, and the air-fuel ratio of the rich-burn cylinder is richer than both the theoretical air-fuel ratio and the target value.

The catalyst is not limited to the three-way catalyst 22. For example, a gasoline particulate filter (a GPF) that is equipped with a three-way catalyst may be used. In short, it is possible to use any catalyst whose temperature can be requested to be raised and whose temperature can be raised with the aid of the heat of oxidation in oxidizing unburnt fuel components and incompletely burnt components in the rich-burn cylinder by the oxygen in the lean-burn cylinders.

The electronic control unit is not absolutely required to be equipped with the CPU 32 and the memory 34 and execute software processes. For example, the electronic control unit may be equipped with a dedicated hardware circuit (e.g., an ASIC or the like) that subjects at least one or some of the values subjected to the software processes in each of the aforementioned embodiments of the disclosure to hardware processes. That is, the electronic control unit may be configured to: (a) be equipped with a process unit that executes all the aforementioned processes according to a program and a memory that stores the program, (b) be equipped with a process unit that executes one or some of the aforementioned processes according to a program, a memory that stores the program, and a dedicated hardware circuit that executes the other process(es), or (c) be equipped with a dedicated hardware circuit that executes all the aforementioned processes. It should be noted herein that a plurality of pairs of process units and memories and a plurality of dedicated hardware circuits may be provided.

The internal combustion engine is not absolutely required to be a four-cylinder internal combustion engine. For example, the internal combustion engine may be an in-line six-cylinder internal combustion engine. In this case, the cycle of the process of FIG. 4 may be set to, for example, 120° CA, in view of the fact that the cycle of emergence of combustion strokes that are adjacent to each other in a time-series manner is 120° CA. Besides, for example, the internal combustion engine may be a V-type internal combustion engine or the like that is equipped with a first catalyst and a second catalyst that purify exhaust gas in different cylinders respectively.

Each of the fuel injection valves is not absolutely required to inject fuel into each of the combustion chambers 14, but may inject fuel into, for example, the intake passage 12. It is not indispensable to perform feedback control of the air-fuel ratio when dither control is performed.

What is claimed is:

1. A control apparatus for an internal combustion engine, comprising:
    an electronic control unit configured to:
    (i) execute a dither control process, the dither control process being a process that is designed to control the internal combustion engine, which is equipped with a catalyst designed to purify exhaust gas discharged from a plurality of cylinders, and that operates fuel injection valves corresponding to the plurality of the cylinders respectively so as to control an air-fuel ratio in a lean-burn cylinder as one of the plurality of the cylinders or each of some of the plurality of the cylinders to an air-fuel ratio leaner than a target value for an average of air-fuel ratios in the plurality of the cylinders, and so as to control an air-fuel ratio in a rich-burn cylinder as the other cylinder or each of the other cylinders to an air-fuel ratio richer than the target value; and
    (ii) execute a reduction process, the reduction process being a process for reducing a first difference between the air-fuel ratio in the lean-burn cylinder and the target value and a second difference between the air-fuel ratio in the rich-burn cylinder and the target value, while, on a condition that a level of rotational fluctuations of a crankshaft becomes equal to or higher than a predetermined value when the dither control process is executed, holding the average of the air-fuel ratios in the plurality of the cylinders equal to the target value by making the air-fuel ratio in the lean-burn cylinder leaner than the target value and making the air-fuel ratio in the rich-burn cylinder richer than the target value.

2. The control apparatus according to claim 1, wherein the electronic control unit is configured to execute the dither control process and the reduction process when a request to raise a temperature of the catalyst is made.

3. The control apparatus according to claim 1, wherein the electronic control unit is configured to execute the dither control process and the reduction process when a temperature of the catalyst is equal to or higher than a predetermined temperature and equal to or lower than a prescribed temperature.

4. The control apparatus according to claim 1, wherein the electronic control unit is configured to execute the dither control process and the reduction process as soon as the internal combustion engine is started in a cold state.

5. The control apparatus according to claim 1, wherein the electronic control unit is configured to execute the reduction process again after executing the reduction process on the condition that the level of the rotational fluctuations becomes equal to or higher than the predetermined value.

6. The control apparatus according to claim 1, wherein the electronic control unit is configured to, in the reduction process, make amounts of reduction larger when a frequency with which the level of the rotational fluctuations becomes equal to or higher than the predetermined value is higher than a predetermined frequency than when the frequency with which the level of the rotational fluctuations becomes equal to or higher than the predetermined value is equal to or lower than the predetermined frequency, the amounts of reduction being amounts by which the first difference and the second difference are respectively reduced on the condition that the level of the rotational fluctuations becomes equal to or higher than the predetermined value.

7. The control apparatus according to claim 1, wherein the electronic control unit is configured to:
(i) hold the average of the air-fuel ratios in the plurality of the cylinders equal to the target value on a condition that the rotational fluctuations at the level equal to or higher than the predetermined value are not detected within a predetermined period, after executing the reduction process, and
(ii) execute an increase process for increasing the first difference between the air-fuel ratio in the lean-burn cylinder and the target value and the second difference between the air-fuel ratio in the rich-burn cylinder and the target value, while holding the average of the air-fuel ratios in the plurality of the cylinders equal to the target value after executing the reduction process.

8. The control apparatus according to claim 7, wherein the electronic control unit is configured to execute the increase process again after executing the increase process on the condition that the rotational fluctuations at the level equal to or higher than the predetermined value are not detected within the predetermined period.

9. The control apparatus according to claim 7, wherein the electronic control unit is configured to, in the increase process, make amounts of increase larger when the frequency with which the level of the rotational fluctuations becomes equal to or higher than the predetermined value is equal to or lower than a predetermined frequency than when the frequency with which the level of the rotational fluctuations becomes equal to or higher than the predetermined value is higher than the predetermined frequency, the amounts of increase being amounts by which the first difference and the second difference are respectively increased on the condition that the rotational fluctuations at the level equal to or higher than the predetermined value are not detected within the predetermined period.

10. The control apparatus according to claim 7, wherein the electronic control unit is configured to:

(i) execute a request value setting process for variably setting a base request value as a base value of a request value of the first difference between the air-fuel ratio in the lean-burn cylinder and the target value and the second difference between the air-fuel ratio in the rich-burn cylinder and the target value, in accordance with an operating state of the internal combustion engine, (ii) execute a guard process for inputting the base request value and limiting the request value to a value equal to or smaller than a guard value, (iii) control the first difference between the air-fuel ratio in the lean-burn cylinder and the target value and the second difference between the air-fuel ratio in the rich-burn cylinder and the target value to the request value in the dither control process, (iv) reduce the guard value in the reduction process, and (v) increase the guard value toward the base request value in the increase process.

* * * * *